(12) United States Patent
Flanagan et al.

(10) Patent No.: US 6,817,009 B2
(45) Date of Patent: Nov. 9, 2004

(54) METHOD AND APPARATUS FOR VERIFYING DATA LOCAL TO A SINGLE THREAD

(75) Inventors: Cormac Andrias Flanagan, San Francisco, CA (US); Stephen N. Freund, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 785 days.

(21) Appl. No.: 09/728,629

(22) Filed: Nov. 30, 2000

(65) Prior Publication Data

US 2002/0129306 A1 Sep. 12, 2002

(51) Int. Cl.[7] .............................. G06F 9/44; G06F 9/45; G06F 11/00
(52) U.S. Cl. .......................... 717/126; 717/144; 714/38
(58) Field of Search ............................... 717/124–132; 714/100, 38; 345/700

(56) References Cited

U.S. PATENT DOCUMENTS

| | | | | |
|---|---|---|---|---|
| 5,822,588 | A | * 10/1998 | Sterling et al. | 717/131 |
| 6,009,269 | A | * 12/1999 | Burrows et al. | 717/130 |
| 6,343,371 | B1 | * 1/2002 | Flanagan et al. | 717/124 |
| 6,593,940 | B1 | * 7/2003 | Petersen et al. | 345/700 |
| 2002/0120428 | A1 | * 8/2002 | Christiaens | 702/186 |

OTHER PUBLICATIONS

Choi et al., "Escape Analysis for Java", ACM, Nov. 1999, pp. 1–19, ISBN 1–58113–238–7/99/001.
Nicholas Sterling, "WARLOCK: A Static Data Race Analysis Tool", SunSoft, Inc., Jan. 1993, pp. 1–12, USENIX Winter 1993 Conference Proceedings.
Whaley et al., "Compositional Pointer and Escape Analysis for Java Programs", ACM, Nov. 1999, pp. 187–206, ISBN 1–58113–238–7/99/0010.
Savage et al., "Eraser: A Dynamic Data Race Detector for Multi–Threaded Programs", ACM, Oct. 1997, pp. 27–37, ISBN 0–89791–916–5/97/0010.
Lucassen et al., "Polymorphic Effect Systems", Proceedings of the Fifteenth Annual ACM SIGACT–SIGPLAN Symposium on Principles of Programming Languages, San Diego, CA, Jan. 1988, pp. 47–57, ACM–0–89791–252–7/88/0001/0047.
Talpin et al., "Polymorphic Type, Region and Effect Inference", *Journal of Functional Programming*, vol. 2, No. 2, Cambridge University Press, 1992, pp. 1–27.
Andrew D. Birrell, "An Introduction to Programming with Threads", Digital Equipment Corp., Systems Research Center, 130 Lytton Avenue, Palo Alto, CA 94301, 1989.

* cited by examiner

*Primary Examiner*—Anil Khatri
*Assistant Examiner*—Trent Roche

(57) ABSTRACT

Concurrent program analysis is fashioned for detecting potential race conditions such as data races in computer programs. One feature of this analysis is verifying annotations of addressable resources in a program. Annotations are verified by checking if thread-local resources are indeed thread-local, and that thread-shared data spaces are not in fact thread-local. Another feature is detecting potential race conditions, such as data races, in the computer program. The computer program can spawn a plurality of threads that are capable of being executed concurrently. The source code of the computer program being analyzed includes an element annotated as either thread-local or thread-shared. The validity of the thread-local annotation is verified if the element is annotated in the computer program as thread-local, wherein an invalid thread-local annotation may cause a race condition.

17 Claims, 6 Drawing Sheets

MORE CHECKS:

thread shared class A {
    Object f;
    void foo() {...}
} thread local class B extends A {
    Object y;
    void foo() {... this.g ...}
}
                    of type B Create a B object
cast it to type A
Pass it between threads
Cast it back to type B
and access fields of B.

THREAD 1  501 → B [ r / g ] A
THREAD 2  502 ↗

(typecasts)
OK if no downcasts from A to B

- explicit    c is of type A
    d=(B)c
    d.g

- implicit
    c is of type A (but actually points to a B object)
    c.foo().

FIG. 5

METHOD AND APPARATUS FOR VERIFYING DATA LOCAL TO A SINGLE THREAD

BACKGROUND OF THE INVENTION

1. Field of Invention

This invention relates generally to concurrent program analysis and more specifically to tools for detecting races such as data races in multithreaded programming.

2. Background of the Invention

Concurrent programming involves multiple concurrent flows of control to perform multiple tasks in parallel. Each time a task is invoked, a thread is used to implement the particular task. A "thread" is a single sequential flow of control that can be abstractly thought of as an independent program control block. Each thread can execute its instructions independently, allowing a multithreaded program to perform numerous tasks concurrently. Having multiple threads in a program means that multiple threads can be executing in parallel, where each thread is running its own execution path. Namely, at any instance the multithreaded program has multiple points of execution, one in each of its threads. Additionally, a multithreaded program creates a new thread by some mechanism, such as calling "Fork" with a given procedure and arguments. The thread starts execution by invoking the procedure with the given arguments. The thread terminates when the procedure returns.

As a simple example, consider the following program which executes the functions $f_1(x)$, $f_2(x)$, and $f_3(x)$ in parallel. In this example, a thread is created by calling "Fork", and giving it a function and arguments.

```
Program P_1{
    VAR T_1, T_2, T_3: THREAD;
        function f_1(x){}
        function f_2(x){}
        function f_3(x){}
        T_1:= Fork(f_1,x);
        T_2:= Fork(f_2,x);
        T_3:= Fork(f_3,x);
}
```

In multithreaded programs a shared addressable resource is one that can be accessed by multiple threads (i.e., shared across multiple threads). Typically, large multithreaded programs have sections of code that operate on one or more program elements corresponding to shared addressable resources (hence, they are shared program elements). Global variables are an example of shared program elements. Addressable resources (or simply "resources") include, for example, one or more of input/output (I/O) ports and address spaces in memory that are allocated for data objects such as arrays, records, fields, structures, classes, or objects. Synchronization mechanisms are needed in order to permit the threads to read from or write to the shared addressable resources without adversely impacting each other's operations. What is more, threads interact with each other through access to the shared addressable resource (e.g., global variables).

Large multithreaded programs also have sections of code that operate on addressable resources that are not shared across multiple threads. Addressable resources that are used in this manner, i.e., addressable resources that have a thread-local property (e.g., used only by a single thread), do not require special means of access protection or exclusion. Multithreaded program analysis depends on the thread-local and thread-shared properties of addressable resources. To facilitate concurrent or multithreaded program analysis, programmers may indicate addressable resources as local or shared by annotating the addressable resources. Programmers annotate addressable resources in order to specify whether a particular data type is thread-local or thread-shared.

In multithreaded programming, access of thread-shared addressable resources requires special attention since multiple threads can operate in parallel to manipulate them and, as a result, errors may arise. For example, when two or more threads in a multithreaded program manipulate an addressable resource (e.g., data structure) simultaneously, without synchronization, addressable resource race conditions occur (hereafter "race conditions"; race conditions affecting access to data are often termed data races or data race conditions). Race conditions often result in non-deterministic program behavior. Race conditions can be avoided by a careful programming discipline that implements and maintains mutual exclusion, including protecting an addressable resource with a "lock" and acquiring the lock before manipulating the resource. Namely, only the thread that "holds" the lock can manipulate the addressable resource. A data type known as "mutex" and the construct known as "lock" are implemented to achieve mutual exclusion (and can be expressed in the form:

Var x: mutex;

Lock x Do . . . statements . . . End;).

The "Lock" clause imposes serialization of threads' access and manipulation of shared addressable resources. Since at each instance one and only one thread can hold the lock, careful adherence to this lock-based synchronization discipline ensures a race-free program.

To facilitate mutual exclusion, various program analysis tools, such as escape analysis for Java, can infer which addressable resources have the thread-local property. Escape analysis for Java is described in more detail in an article by Jong-Dock Choi et al., entitled "Escape Analysis for Java", 1999, ACM. Escape analysis is further described in an article by John Whaley et al. entitled "Compositional Pointer and Escape Analysis for Java Programs" 1999, ACM. Both articles are incorporated herein by reference. Escape analysis works by performing an analysis of the entire program. Escape analysis is not capable of verifying thread-local annotations if only part of the program is provided. Inferring thread-local properties requires substantially more computational resources than just verifying them and therefore is not as efficient.

Conventional static analysis tools, such the Warlock, are not capable of verifying that certain data locations have the thread-local property. Warlock is described in an article by Nicolas Sterling entitled "Warlock, A Static Data Race Analysis Tool" Usenix, Winter Technical Conference, 1993, which is incorporated herein by reference. Warlock allows a programmer to annotate an addressable resource as being local to a thread. However, Warlock does not verify whether the thread-local annotation is correct.

Another tool, Eraser, is described in an article by Stefan Savage et al. entitled "Eraser: A Dynamic Data Race Detector for Multi-Threaded Programs," 1997, ACM. Eraser is a dynamic analysis tool that monitors lock acquisitions and data accesses while a concurrent program executes. Eraser determines the locks that protect each addressable resource (e.g., data location) accessed by the program. Eraser allows addressable resources that are not visible to multiple threads to be without locks. As with escape analysis, the information about thread-local type resources is inferred, rather than relying on annotations.

Accordingly, there exists a need for a more effective concurrent program analysis tool that is a better predictor of potential race conditions. The present invention addresses the foregoing and related problems.

SUMMARY OF THE INVENTION

The present invention provides a method and apparatus used in concurrent program analysis for detecting races, such as data races. A feature of the invention is verifying annotations of addressable resources in a program. The present invention verifies annotations by checking if thread-local addressable resources are indeed thread-local. Alternatively stated, the present invention checks the validity of the thread-local annotations, and it further checks the validity of the thread-shared annotations.

In one embodiment of the present invention, checks are run on elements of a computer program source code that are annotated as thread local in order to determine the validity of their respective thread-local annotations. Alternatively stated, checks are run on the elements of the source code that are annotated as thread-local to verify that such elements are indeed thread-local and not in fact thread-shared. Further examination can determine if elements of the source code that are annotated as thread-shared are in fact sharable. Additional requirements are needed to ensure the validity of the thread-local annotations when one addressable resource is derived from another as when one class is derived from another. Programs that satisfy these requirements are guaranteed not to share values of thread-local type between multiple threads. Therefore, the analysis enables static tools to properly check programmer annotations indicating which data types are thread-shared and which are thread-local.

Hence, in accordance with the purpose of the invention, as embodied and broadly described herein, the invention relates to a method used in concurrent program analysis for detecting potential race conditions, such as data races, in a computer program. The computer program can spawn a plurality of threads that are capable of being executed concurrently. The method includes receiving the source code of a computer program. The source code includes an element annotated as either thread-local or thread-shared. The method also includes determining if the element is annotated as thread-shared or thread-local; and verifying the validity of the thread-local annotation if the element is annotated in the computer program as thread-local. An invalid thread-local annotation may cause a race condition. The method further includes indicating a race condition warning or error if upon verifying the validity of the thread-local annotation it is determined that the element or a portion thereof is visible from more than one, rather than one and only one, of the plurality of threads.

In further accordance with the purpose of the invention, as embodied and broadly described herein, the invention relates to an apparatus for concurrent program analysis. The apparatus includes means for receiving source code of the computer program. The source code includes an element annotated as either thread-local or thread-shared. The apparatus also includes means for type checking the source code; and means for thread-local checking located either inside or in series with the type checking means. The means for thread-local checking includes means for verifying the validity of the thread-local annotation if the element is annotated in the computer program as thread-local, wherein invalid thread-local annotation may cause a race condition such as a data race. The apparatus can further include means for parsing the source code; and means for creating from the source code an abstract syntax tree.

Accordingly, the present invention beneficially provides for a more effective concurrent program analysis. The description that follows provides a more detailed description of the invention.

BRIEF DESCRIPTION OF THE DRAWINGS

FIG. 5 illustrates a 'more checks' aspect of the process of FIG. 4.

DETAILED DESCRIPTION OF THE INVENTION

The present invention relates to races such as data races in concurrent programming. Preferably, the present invention provides a tool for detecting potential race conditions in multithreaded programs. The method implemented by the tool verifies that addressable resources annotated as thread-local indeed are thread-local, thus requiring no lock protection. The advantage of verifying that thread-local resource is not in fact thread-shared can be readily apparent to one of ordinary skill in the art since thread-shared resources must be lock-protected. Addressable resources erroneously annotated as thread-shared, instead of thread-local, receive lock protection that is unnecessary. Therefore, it is far less important but useful to know that addressable resources annotated as thread-shared are in fact shared among threads.

To enable one of ordinary skill in the art to make and use the invention, the description of the invention is presented herein in the context of a patent application and its requirements. This description illustrates the general principles of the invention and is not to be construed in a limiting sense. Although the invention is described in accordance with the shown embodiments, one of ordinary skill in the art will readily recognize that there could be variations to the embodiments and those variations would be within the scope and spirit of the invention.

Figure 1:
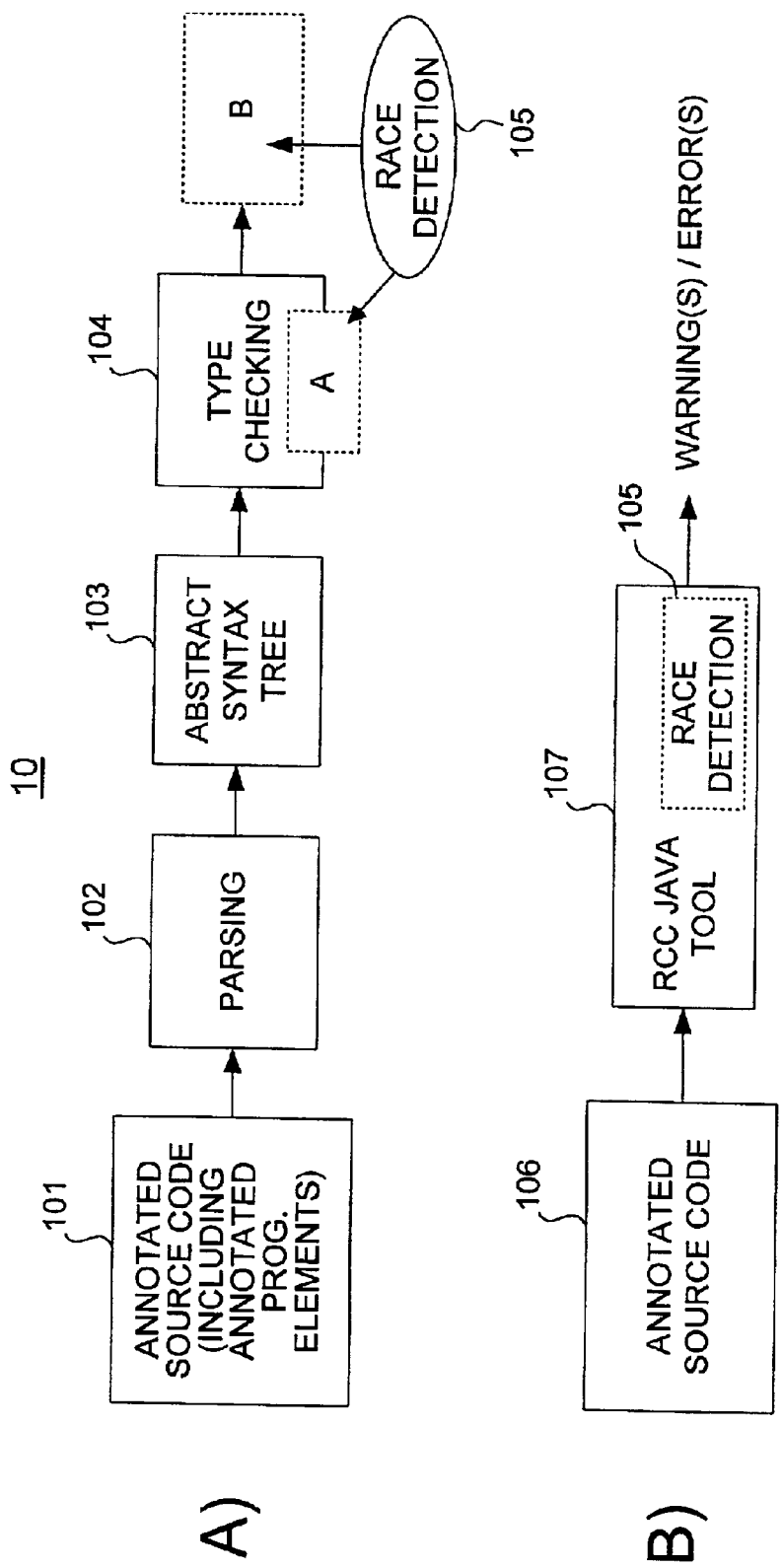
FIGS. 1A and 1B, each illustrates an embodiment of the present invention in a program analysis tool.

FIG. 1A illustrates by way of example an embodiment of the present invention in a concurrent program analysis tool 10. As shown the tool includes a parsing stage 102 that receives a source code 101 of a computer program. According to the purpose of the present invention, the source code 101 includes elements annotated as thread-local or thread-shared. Hence the source code is referred to as annotated source code. The illustrated tool includes an additional stage for forming an abstract syntax tree 103. As further shown, the type checking stage 104 is either in series with (B) or includes (A) the race detector 105. FIG. 1B illustrates the race condition checker (RCC) for lava tool 107 with the race detector stage 105 embodied therein. The race detector checks the elements in the annotated source code for potential race conditions.

To understand the annotations in the source code, consider several types of program source code elements (hereafter "elements"). In object oriented programming, an element can be a class structure, portions of which being fields. Each field may itself be an element, portions of which being attributes such as data structures and pointers to methods. Depending on the type of platform or programming environment in which the present invention is embodied, other types of elements are possible, including for example data structures, arrays, fields, records, etc. It is noted that each element defines and/or manipulates an addressable resource (e.g., memory space, I/O port etc.), thus element and addressable resource may be referred to herein interchangeably.

Figure 2:
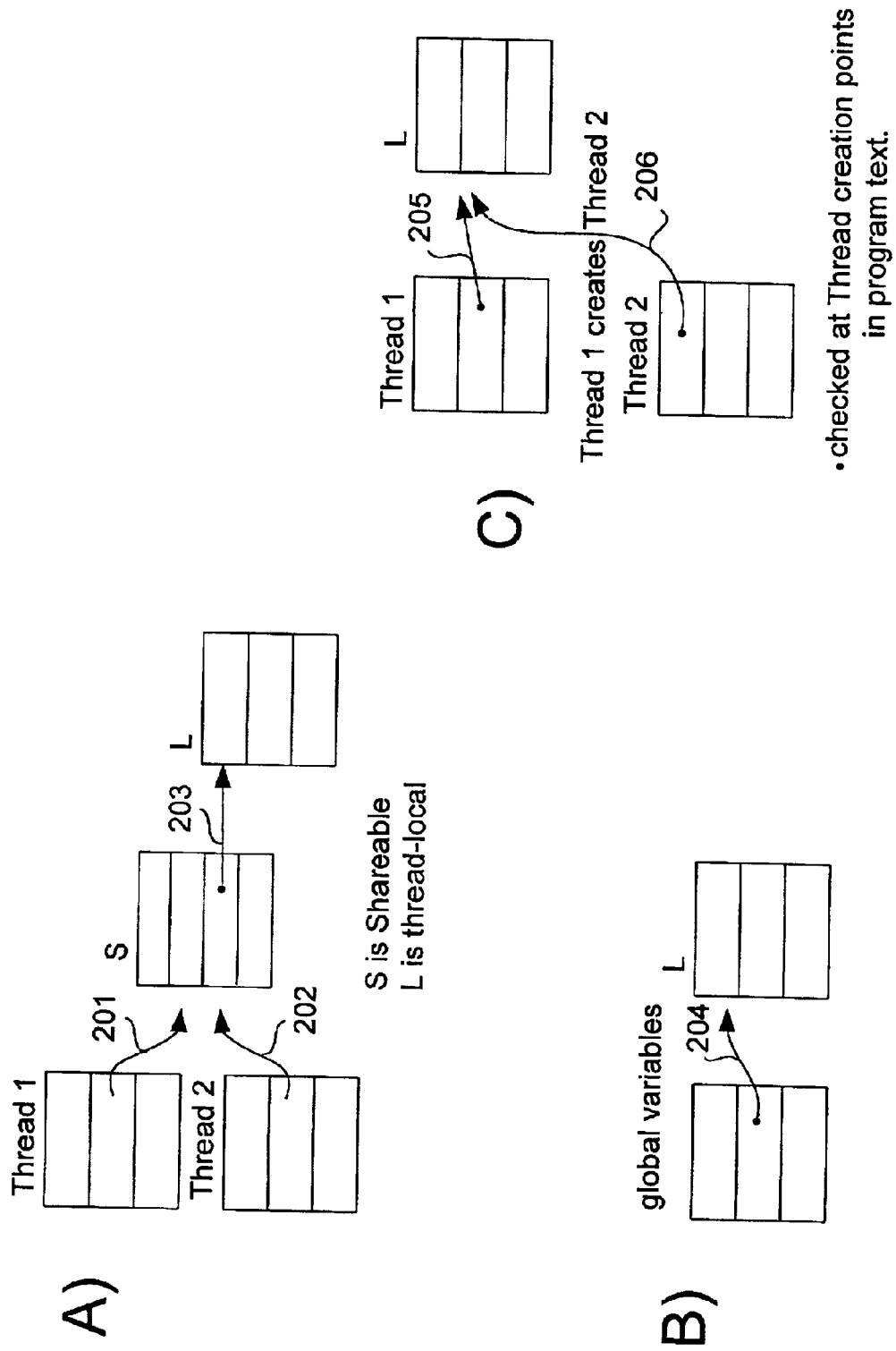
FIGS. 2A–2C, each illustrates possible program source code elements with annotations to be verified.

To further explain annotation verification, each of FIGS. 2A–2B illustrates possible program source elements with associate annotations to be verified. As shown in FIG. 2A, a shared addressable resource is visible from more than one thread (via links 201 & 202). Global variables (as shown in FIG. 2B) for example are shareable addressable resources. It follows that in source code presented to the tool for analysis shared addressable resources should be annotated as thread-shared. By comparison, an addressable resource that is visible from one and only one thread is said to be local, as it does not escape the scope of the thread. An element annotated as thread-local does not have lock protection associated therewith. Accordingly, as previously noted, it is important to verify that in actual fact an element should not be annotated thread-shared. It will be further shown herein below that a thread-shared annotated element cannot include or point to a thread-local annotated space (e.g., via links 203 or 204).

As shown in FIG. 2C, although the element is annotated as thread-local (L), more than one thread has access to this element (via links 205 and 206). If this element was visible from thread 2 and only thread 2, it would be have been local to thread 2. Because this element is shared rather than local, it is incorrectly annotated as thread-local. This situation arises if thread 2 is spawned by thread 1 and is given access to some of the elements belonging to thread 1.

Figure 3:
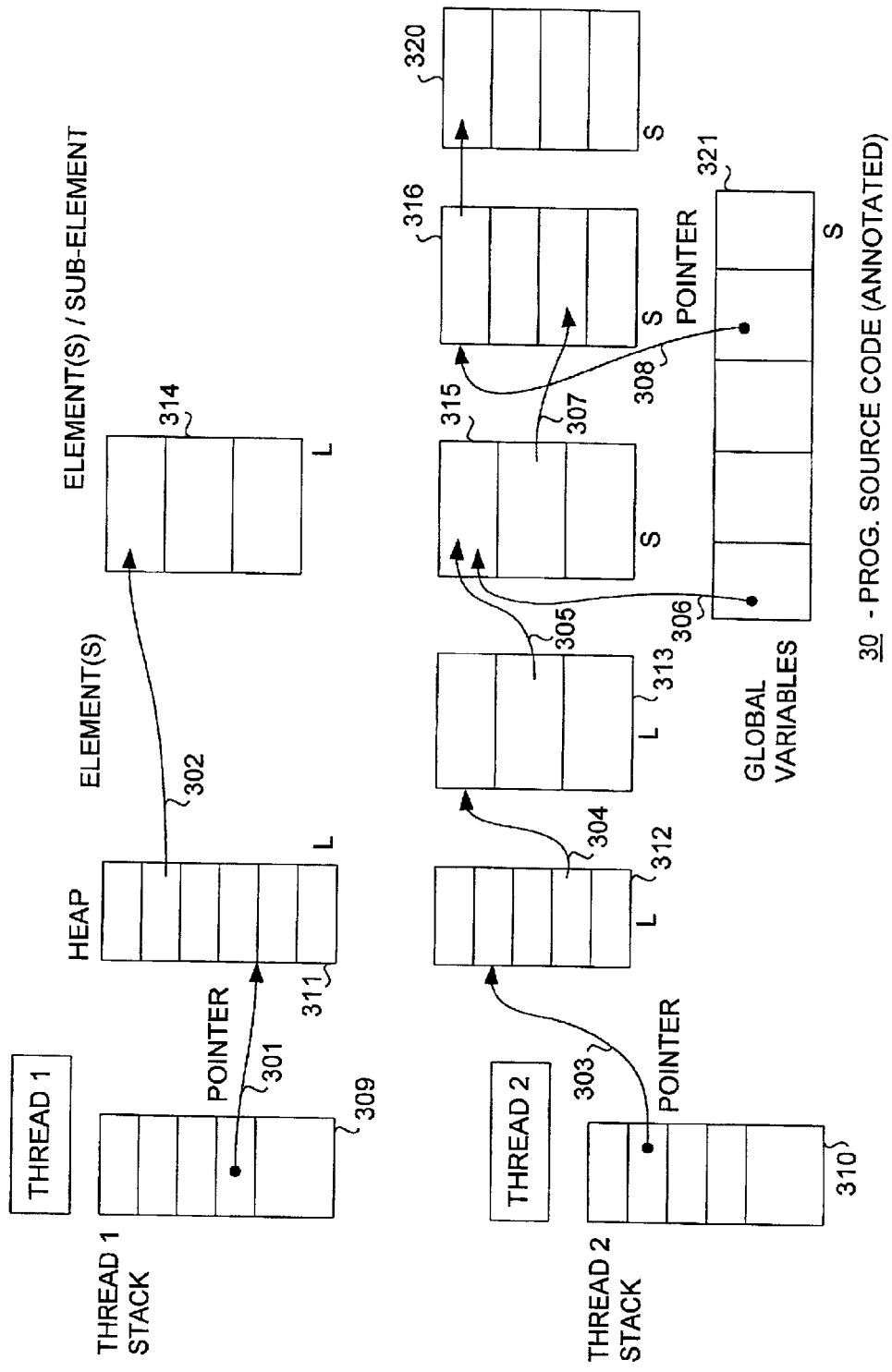
FIG. 3 illustrates a program configuration of various addressable resources with their respective annotations to be verified.

FIG. 3 illustrates a program configuration 30 of various addressable resources with their respective annotations to be verified. As shown, each of the threads has a thread stack, thread 1 stack 309 and thread 2 stack 310, respectively. In the context of programming, a stack is an area or buffer used for storing a push-down list of calls and associated arguments (elements such as methods, data variables and pointers) that need to be handled. In this example, each of the thread 1 stack 309 and thread 2 stack 310 store a pointer 301 and 303 to a heap element 311 and 312, respectively. Unlike a heap, the stack stores elements in a certain order and returns them in the same order. In the context of programming, a heap is an addressable resource of pre-reserved memory that a program flow of control associated with the space can use to dynamically store data while the program is running. The heap is allocated in advance to make it easier and faster to manage storage, although the amount of data to be stored in a heap is initially unknown until the program is running.

As further shown in FIG. 3, heap elements 311 and 312 are labeled "L" to indicate that the program creating them annotated the heap elements as thread-local. (As mentioned, a thread-local element is visible from one and only one thread.) Similarly, elements (e.g., 315) labeled "S" are annotated in the program as thread-shared. An element in the heap 311 and 312 may link or point to other elements allocated in the heap, such as via links/pointers 302 and 304, respectively. One of the elements (e.g., 313) annotated in the source code as thread-local points via link 305 to a thread-shared memory location corresponding to a thread-shared (S) annotated element 315. Moreover, some of the thread-local memory locations may have portions (such as pointers in a pointer array, members in a data structure or fields in a record) that are locations corresponding to thread-shared elements. It is the intent of the present invention to ensure that those memory locations that correspond to thread-local elements in the program are accessible to one and only one thread. As additionally shown in FIG. 3, global variable locations 321 may contain pointers to addressable resources (e.g., memory locations 315 and 316) that are visible from one or multiple threads. By their nature, global variables are accessible from all threads, and therefore they must be annotated as thread-shared.

Clearly, elements annotated incorrectly as thread-shared receive needless lock-based protection. However, elements annotated incorrectly as thread-local are left without essential lock-based protection for preventing corruption of data and non-deterministic results of program execution due to races. In view of the above, as provided by the present invention, the validity of all the thread-local annotations is verified.

Accordingly, using the illustrations in FIGS. 2A–2C, thread-local annotations are tested against a first set of requirements for verifying their validity. The first set of requirements or constraints include:

(1) since, by definition, a thread-shared element is accessible by multiple threads, all of its portions (e.g., object attributes, structure members, fields etc.) are also accessible by multiple threads and none can include or point to a thread-local annotated element portion. A thread-shared element may also include values of non-reference type, such as integers;

(2) since, by definition, global variables are shareable, global variables should be annotated thread-shared i.e., accessible from multiple threads with lock-based protection. Moreover, all portions of global variables should be thread-shared annotated; and (3) when a second thread is spawned from a first thread, any elements (e.g., data variables) passed from the first thread during creation of the second thread should be sharable, i.e., annotated thread-shared.

Figure 4:
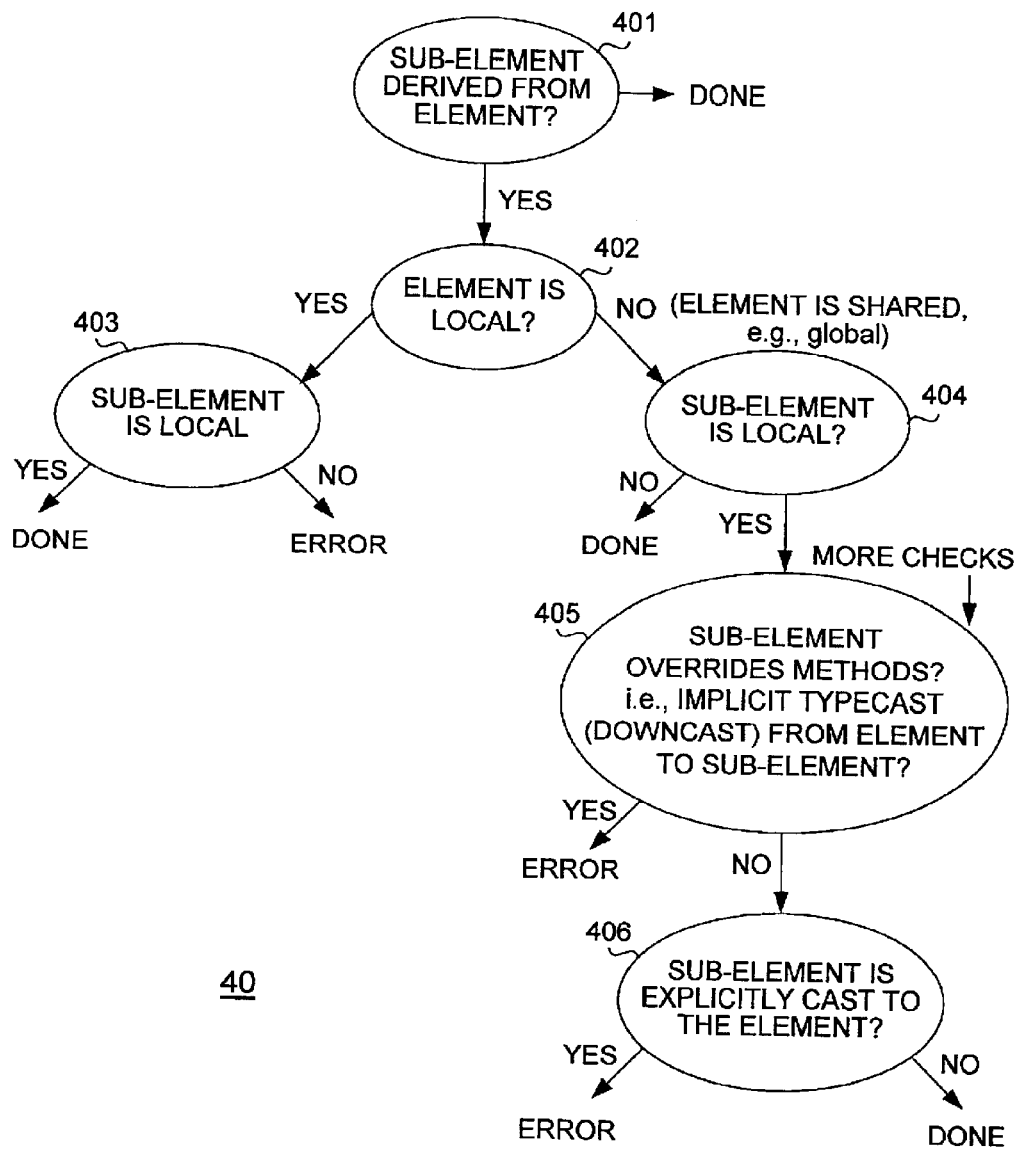
FIG. 4 is a flow diagram illustrating the process of analyzing source code elements annotation in accordance with the present invention.

In some instances, thread-local annotations must satisfy a second set of requirements, as will be later explained with reference to FIG. 4. Thread-local annotations are tested against the second set of requirements when, for example, a class is derived from another class.

Going back to FIG. 2A to illustrate requirement (1), a thread-shared annotated element (S) is visible by both thread 1 and thread 2. In addition, the thread-shared annotated element (S) includes or points to (via link 203) a thread-local annotated element (L). This means that contrary to its definition the thread-local element can be accessed through the thread-shared element by both thread 1 and thread 2, rather than by one and only one thread. Accordingly, the present invention will flag a warning or an error as to this thread local annotation. Namely, a warning or error indication is provided when a thread-shared annotated element includes or points to a thread-local annotated element.

Turning to the example in FIG. 2B, one of the global variables either includes or points to a thread-local annotated variable (via link 204). Accordingly, the thread-local annotation appears to violate requirement (2), as noted above. The present invention flags a warning or error in this case.

Using the illustration in FIG. 2C, it is assumed that the computer program spawns thread 2 from thread 1. Upon its creation thread 2 may gain access to the element that is visible from thread 1 if that element is passed as an argument to thread 2. Namely, the element is no longer visible by one and only one thread. Accordingly, since in this example the element is annotated as thread-local (L), the element is flagged with a warning or error indication.

To address the evaluation of source code where a second element is derived from another, the thread local annotation is additionally verified against the aforementioned second set of requirements. FIG. 4, is a flow diagram illustrating the process of analyzing source code elements annotation in accordance with the present invention.

As shown, if a sub-element is derived from an element (401) its is determined if the element is annotated as thread-local (402). If both the element and sub-element are annotated as thread-local (402 and 403), the thread-local annotations are deemed proper. However, if the element is annotated as thread-local but the sub-element is not annotated as thread-local (i.e., it is annotated as thread-shared), the element and sub-element are flagged with a warning or error indication. If both the element and sub-element are annotated as thread-shared (402 and 404), the annotations are deemed proper. If the element is not annotated as thread-local (i.e., it is annotated as thread-shared, 402), and the sub-element is annotated as thread-local (404), more checks are necessary (an example of this situation is shown in FIG. 5). In the context of an object-oriented language, these additional checks include determining if the subclass overrides methods declared in the superclass (405). Namely, if there is an implicit downcast from the element to the sub-element such that the sub-element overrides methods declared in the element, the clement and sub-element are flagged with a warning or an error. If the sub-element does not override methods but it is explicitly cast to the element (406), a warning or error is indicated with respect to the element and sub-element. On the other hand, if the sub-element does not override the methods declared in the element (405) and is not explicitly cast to the element (406), the annotations of the element and sub-element are deemed proper. The element may be associated with one or more additional sub-elements in which case the foregoing determinations will be made as to the element and each of the additional sub-elements.

Figure 6:
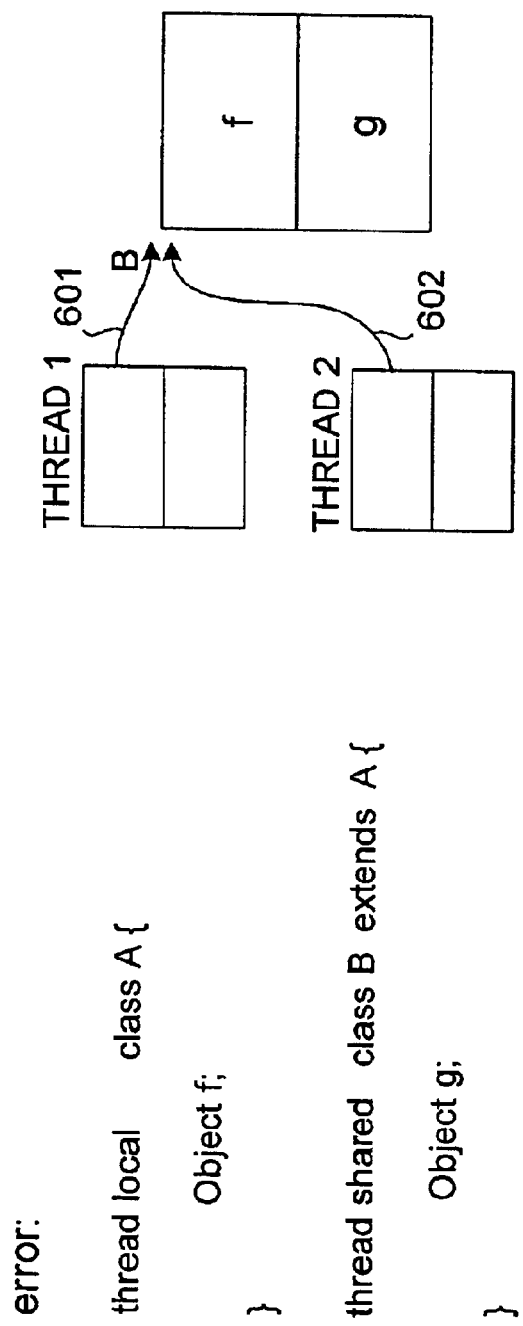
FIG. 6 illustrates an 'error' aspect of the process of FIG. 4.

It is noted that in each case where the annotation is deemed proper, the checking of the annotations is done. If more checking is necessary it may result in a determination that the annotation is proper or improper. FIG. 5 illustrates a 'more checks' aspect of the process of FIG. 4, i.e., a situation where more checks are needed. An improper annotation results in a warning or error indicating a potential race condition. FIG. 6 illustrates an 'error' aspect of the process of FIG. 4, i.e., a situation where an error (or warning) is indicated.

In the example of FIG. 5, the element defined as Class A is annotated as thread-shared. The attributes of Class A are Object f and method foo( ). Class B is derived from Class A and has attributes Object f (inherited from Class A), Object g, and method foo (which overrides the attribute inherited from Class A). Class B is declared as thread-local. As shown, an instance of Class B is visible from thread 1 (via 501). This instance can be viewed as an instance of Class A, and may therefore be passed as an argument to thread 2 (502). This situation leads to the improper sharing of the thread-local object of Class B. Both threads may simultaneously access g through calls to the foo( ) method. The rest of this paragraph describes the additional checks necessary to correctly verify the validity of the annotations in this type of program. In accordance with the process of FIG. 4, steps 401, 402 and 404, this source code setting requires more checks. The annotations associated with the class and sub-class are deemed proper if there is no explicit or implicit downcast from class A (element) to class B (sub-element). Namely, for an element c of type class A, an explicit downcast can be demonstrated by $$d=(B)c;$$

$$dg;$$

where d is an element of type class B. An implicit down cast where an element c of type class A actually points to an element (object) of type class B can be demonstrated by:

$$c.foo(\ ).$$

Alternatively stated, the object of type class B is created and inherits the attributes of the object of type class A, i.e., cast to type class A object. Since the object type class A is annotated as thread-shared and the object type class B is annotated as thread-local, more checks are needed as outlined above. In this example, object type class A is passed between threads 1 and 2 and cast back to type class B. Thus, access is gained to the attributes of object type class B from both threads 1 and 2. The attributes, object f, of class A is visible to both threads 1 and 2, and through foo( ) object g of class B may also be visible by threads 1 and 2. Downcasting in this case produces a warning or error indication as shown in FIG. 6.

In summary, the present invention enforces two sets of constraints that an annotated source code must meet in order to, primarily, verify the validity of thread-local annotations and, secondarily, verify thread-shared annotations. Invalid annotations produce a warning or error indication of a potential race condition. This verification in accordance with the present invention provides a more effective concurrent programming source code analysis.

Although the present invention has been described in accordance with the embodiments shown, variations to the embodiments would be apparent to those skilled in the art and those variations would be within the scope and spirit of the present invention. Accordingly, it is intended that the specification and embodiment a shown be considered as exemplary only.

What is claimed is:

1. A method used in a concurrent program analysis for detecting potential race conditions, such as data races, in a computer program, comprising:

receiving a source code of the computer program, the source code including an element annotated as either thread-local or thread-shared;

determining if the element is annotated as thread-shared or thread-local;

spawning, by the computer program, a plurality of threads that are capable of being executed concurrently; and verifying the validity of the thread-local annotation if the element is annotated as thread-local by determining whether the element annotated as thread-local can be accessed through more than one thread;

wherein an invalid thread-local annotation may cause a race condition.

2. A method used in a concurrent program analysis for detecting potential race conditions, such as data races, in a computer program, comprising:

receiving a source code of the computer program, the source code including an element annotated as either thread-local or thread-shared;

determining if the element is annotated as thread-shared or thread-local; and verifying the validity of the thread-local annotation if the element is annotated as thread-local;

wherein an invalid thread-local annotation may cause a race condition, and wherein the computer program can spawn a plurality of threads that are capable of being executed concurrently, the method further comprising:

indicating a race condition warning or error if upon verifying the validity of the thread-local annotation of the element it is determined that the element is, in fact, visible from more than one, rather than one and only one, of the plurality of threads.

3. A method used in a concurrent program analysis for detecting potential race conditions, such as data races, in a computer program, comprising:

receiving a source code of the computer program, the source code including an element annotated as either thread-local or thread-shared;

determining if the element is annotated as thread-shared or thread-local;

spawning a plurality of threads that concurrently run;

verifying the validity of the element annotated as thread-local or thread-shared by determining if an element annotated as thread-shared includes a portion annotated as thread-local and/or a link to another element that is annotated as thread-local; and indicating a race condition warning or error if the portion and/or the other element are annotated as thread-local.

4. The method of claim 1, wherein the element can be a global addressable resource and, if so, the method further comprises:

verifying that the element does not include a portion annotated as thread-local and/or a link to another element that is annotated as thread-local; and indicating a race condition warning or error if the portion and/or the other element are annotated as thread-local.

5. The method of claim 3, wherein the element is a class structure, an object, a data structure or a record, the portion of which respectively being a class object, an attribute, a structure element, or a field.

6. A method used in a concurrent program analysis for detecting potential race conditions, such as data races, in a computer program, comprising:

receiving a source code of the computer program, the source code including an element annotated as either thread-local or thread-shared;

determining if the element is annotated as thread-shared or thread-local;

spawning a plurality of threads that concurrently run;

verifying the validity of the element annotated as thread-local or thread-shared by determining if an element annotated as thread-shared includes a pointer or a reference to a different element;

verifying that the different element is not annotated as thread-local; and indicating a race condition warning or error if the different element is annotated as thread-local.

7. The method of claim 6, further comprising:

indicating a race condition warning or error if the element is thread-shared annotated and it is determined that the at least one portion of the element points to another element of the source code that is thread-local.

8. A method used in a concurrent program analysis for detecting potential race conditions, such as data races, in a computer program, comprising:

receiving a source code of the computer program, the source code including an element annotated as either thread-local or thread-shared;

determining if the element is annotated as thread-shared or thread-local; and verifying the validity of the thread-local annotation if the element is annotated as thread-local;

wherein an invalid thread-local annotation may cause a race condition, and wherein the computer program can spawn a plurality of threads that are capable of being executed concurrently, and wherein verifying the validity of the thread-local annotation includes checking whether at least one portion of the element, or another element pointed to by the element, is visible from more than one, rather than one and only one, of the plurality of threads, and checking whether upon creation of a new thread of the plurality of threads the element is passed to the new thread;

wherein a race condition warning or error is indicated if the element and/or the other element are annotated as thread-local but are visible from more than one, rather than one and only one, of the plurality of threads.

9. A method used in a concurrent program analysis for detecting potential race conditions, such as data races, in a computer program, comprising:

receiving a source code of the computer program, the source code including an element annotated as either thread-local or thread-shared;

determining if the element is annotated as thread-shared or thread-local; and verifying the validity of the thread-local annotation if the element is annotated as thread-local;

wherein an invalid thread-local annotation may cause a race condition, and wherein the computer program can spawn a plurality of threads that are capable of being executed concurrently, and wherein verifying the validity of the thread-local annotation includes checking, if the element is annotated as thread-shared, whether each portion of the element is also annotated as thread-shared;

checking, if the element is visible from more than one of the plurality of threads; whether the element is annotated as thread-shared, and checking, if the element is passed into a new thread that is spawned from one of the plurality of threads, whether the element is annotated as thread-shared;

wherein an invalid thread-local annotation can prompt a warning indication.

10. The method of claim 1, further comprising:

checking whether a sub-element is derived from the element and, if so, checking, if the element is annotated as thread-local, whether the sub-element is also annotated as thread-local, checking, if the element is annotated as thread-shared, whether the sub-element is also annotated as thread-shared, or whether the sub-element is annotated as thread-local, and the sub-element does not override methods declared in the element and the element is not typecast to the sub-element.

11. The method of claim 10 wherein, for any instance in which it is determined that the sub-element is derived from the element, the method further comprises:

providing a race condition warning or error indication if
the element is annotated as thread-local and the sub-element is not annotated as thread-local, or if the element is annotated as thread-shared, the sub-element is annotated as thread-local, and either the sub-element overrides methods declared in the element, or the element is typecast to the sub-element.

12. An apparatus for concurrent program analysis, comprising:

means for receiving source code of a computer program, the source code including an element annotated as either thread-local or thread-shared;

means for type checking the source code; and means for checking annotations located either inside or in series with the type checking means, including means for determining whether the element is annotated as thread-shared or thread-local;

means for verifying the validity of the thread-local annotation if the element is annotated as thread-local by determining whether the element annotated as thread-local can be accessed from a thread-shared element rather than by one and only one thread; and means for providing a warning if the element annotated as thread-local can be accessed from a thread-shared element.

13. The apparatus of claim 12, further comprising:

means for parsing the source code; and means for creating from the source code an abstract syntax tree.

14. An apparatus for concurrent program analysis, comprising:

means for receiving source code of a computer program, the source code including an element annotated as either thread-local or thread-shared;

means for type checking the source code; and means for checking annotations located either inside or in series with the type checking means, including means for determining whether the element is annotated as thread-shared or thread-local; and means for verifying the validity of the thread-local annotation if the element is annotated as thread-local;

wherein an invalid thread-local annotation may cause a race condition such as a data race, and wherein the computer program can spawn a plurality of threads that are capable of being executed concurrently, and wherein the means for checking annotations further includes means for checking, if the element is annotated as thread-local, whether the element is visible from more than one of the plurality of threads;

means for checking, if the element is annotated as thread-shared, whether each portion of the element is also annotated as thread-shared, and means for checking, if the element is passed into a new thread that is spawned from one of the plurality of threads, whether the element is annotated as thread-local;

wherein an invalid thread-local annotation can prompt the apparatus to provide a warning indication.

15. The apparatus of claim 12, wherein the means for checking annotations further includes means for checking whether a sub-element is derived from the element and, if so, means for checking, if the element is annotated as thread-local, whether the sub-element is also annotated as thread-local, means for checking, if the element is annotated as thread-shared, whether the sub-element is also annotated as thread-shared, or whether the sub-element is annotated as thread-local, and the sub-element does not override methods declared in the element and the element is not typecast to the sub-element.

16. The method of claim 15, wherein, for any instance in which it is determined that the sub-element is derived from the element, the means for checking annotations further includes means for providing a race condition warning or error indication if the element is annotated as thread-local and the sub-element is not annotated as thread-local, or if the element is annotated as thread-shared, the sub-element is annotated as thread-local, and either the sub-element overrides methods declared in the element, or the element is typecast to the sub-element.

17. A system for concurrent program analysis having a computer readable medium embodying program code for detecting potential race conditions, such as data races, in a computer program, including instructions for causing the system to:

receive a source code of the computer program, the source code including an element annotated as either thread-local or thread-shared;

determine if the element is annotated as thread-shared or thread-local; and verify the validity of the element annotated as thread-local or thread-shared by determining when a second thread is spawned from a first thread that any elements passed from the first thread during creation of the second thread are annotated as being thread-shared.

* * * * *